US009434447B2

United States Patent
Silva

(10) Patent No.: US 9,434,447 B2
(45) Date of Patent: Sep. 6, 2016

(54) BICYCLE WITH ELECTRIC MOTOR ASSIST

(71) Applicants: 3G Bikes, LLC, Whittier, CA (US); Clever Chen Silva, Whittier, CA (US)

(72) Inventor: Gary Silva, El Segundo, CA (US)

(73) Assignee: 3G BIKES, LLC, Whittier, CA (US)

( * ) Notice: Subject to any disclaimer, the term of this patent is extended or adjusted under 35 U.S.C. 154(b) by 0 days.

(21) Appl. No.: 14/611,048

(22) Filed: Jan. 30, 2015

(65) Prior Publication Data

US 2015/0217833 A1   Aug. 6, 2015

Related U.S. Application Data

(60) Provisional application No. 61/936,171, filed on Feb. 5, 2014.

(51) Int. Cl.
| | |
|---|---|
| *B62M 6/55* | (2010.01) |
| *B62M 6/90* | (2010.01) |
| *B62M 6/65* | (2010.01) |
| *B62M 6/75* | (2010.01) |
| *B62M 6/40* | (2010.01) |
| *B62M 6/60* | (2010.01) |

(52) U.S. Cl.
CPC .............. *B62M 6/55* (2013.01); *B62M 6/40* (2013.01); *B62M 6/65* (2013.01); *B62M 6/75* (2013.01); *B62M 6/90* (2013.01); *B62M 6/60* (2013.01)

(58) Field of Classification Search
CPC .......... B62M 6/55; B62M 6/75; B62M 6/65; B62M 6/40; B62M 6/60
USPC ................................ 180/205.4, 206.1, 206.4
See application file for complete search history.

(56) References Cited

U.S. PATENT DOCUMENTS

| | | | | | |
|---|---|---|---|---|---|
| 5,915,493 | A * | 6/1999 | Nakayama | ............... | B62M 6/40 180/206.4 |
| 5,941,332 | A * | 8/1999 | Dimick | .................... | B62M 6/10 180/205.4 |
| 6,554,730 | B1 * | 4/2003 | Sakai | ....................... | B62M 6/55 180/206.4 |
| 8,640,805 | B2 * | 2/2014 | Kuroki | .................... | B62M 6/45 180/205.1 |
| 8,708,084 | B2 * | 4/2014 | Kuroki | .................... | B62M 6/50 180/205.1 |
| 8,777,791 | B1 * | 7/2014 | Hino | ....................... | B62M 6/55 180/206.4 |
| 2005/0039963 | A1 * | 2/2005 | Forderhase | ............. | B62M 6/55 180/206.4 |
| 2011/0120794 | A1 * | 5/2011 | Hobel | .................... | B62M 11/06 180/206.4 |
| 2012/0247854 | A1 * | 10/2012 | Kyoden | ..................... | B62J 3/00 180/206.4 |

* cited by examiner

*Primary Examiner* — Anne Marie Boehler
*Assistant Examiner* — Marlon Arce
(74) *Attorney, Agent, or Firm* — Knobbe, Martens, Olson & Bear, LLP

(57) ABSTRACT

A bicycle comprising a front wheel and a rear wheel supporting a frame. A bottom bracket of the frame defines a first axis, a second axis and a third axis. A pedal crank assembly is supported for rotation about the first axis and includes a first driven gear and a first drive gear. A second gear is supported for rotation about the second axis. A third driven gear and a third drive gear are supported for rotation about the third axis. An electric motor drives the first driven gear and the first drive gear rotates in response to rotation of the first driven gear. The first drive gear engages and rotates the second gear, which drives the third driven gear. The third drive gear rotates in response to rotation of the third driven gear. The third drive gear is rotationally coupled to the rear wheel.

10 Claims, 5 Drawing Sheets

BICYCLE WITH ELECTRIC MOTOR ASSIST

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND

1. Field

The present invention relates generally to pedal-driven, electrically-assisted vehicles. In particular, the present invention relates to a pedal-driven bicycle with an electric motor assist system.

2. Description of the Related Art

Many electric bicycle designs exist. However, conventional designs suffer from many drawbacks, including being overly complicated, heavy, expensive, and difficult to assemble, adjust, repair or maintain.

SUMMARY

Accordingly, a need exists for improved electric bicycle designs and arrangements, which, in some embodiments, overcome one or more of the drawbacks of the prior art. The systems, methods and devices described herein have innovative aspects, no single one of which is indispensable or solely responsible for their desirable attributes. Without limiting the scope of the claims, some of the advantageous features will now be summarized.

A preferred embodiment involves a bicycle comprising a front wheel, a rear wheel and a frame supporting the front wheel and the rear wheel. An electric motor is supported by the frame. The frame also includes a bottom bracket defining a first axis, a second axis and a third axis. A pedal crank assembly is supported for rotation about the first axis and includes a first driven gear and a first drive gear. A second gear is supported for rotation about the second axis. A third driven gear and a third drive gear are supported for rotation about the third axis. The motor drives the first driven gear and the first drive gear rotates in response to rotation of the first driven gear. The first drive gear engages and rotates the second gear, which drives the third driven gear. The third drive gear rotates in response to rotation of the third driven gear. The third drive gear is rotationally coupled to the rear wheel.

In some configurations, the bottom bracket is of an integral or unitary construction. In some configurations, the first drive gear, the second gear and the third driven gear are direct-engagement bevel gears, which can have linear or angled gear teeth. In some configurations, the first driven gear and the third drive gear are chain or belt-drive sprockets and are connected to the motor and rear wheel, respectively, by a chain or belt.

In some configurations, the bottom bracket is oriented such that the third axis is higher than the first axis when the bicycle is standing upright on a level surface. In some configurations, the first axis, the second axis and the third axis are disposed along a straight line.

In some configurations, the motor is mounted to a down tube of the frame of the bicycle. In some configurations, a battery compartment is coupled to the frame and configured to support the battery in a space between the top tube and the down tube of the bicycle. In some configurations, the motor is positioned between the battery compartment and the bottom bracket.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
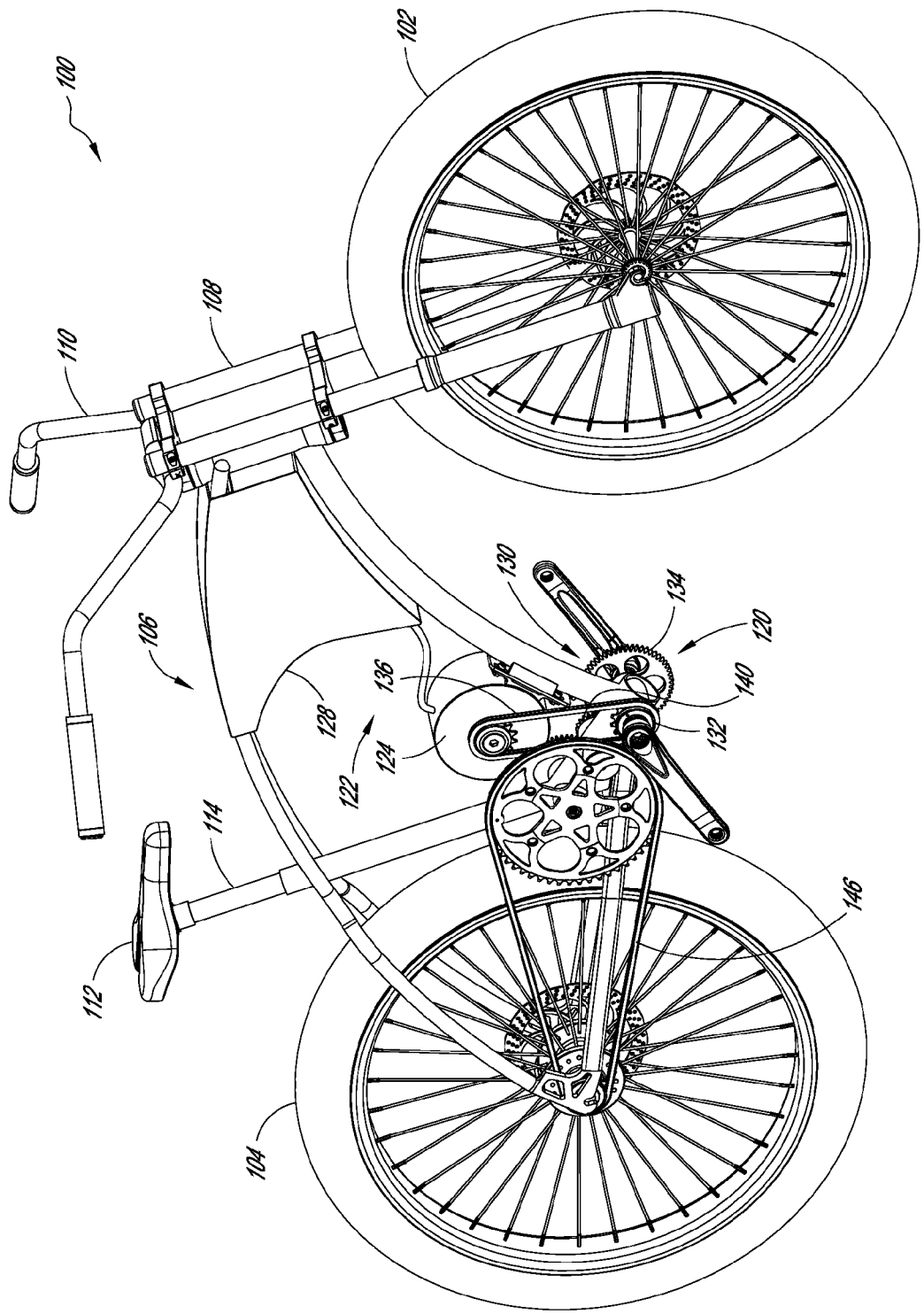
FIG. 1 is a perspective view of a bicycle including a pedal crank assembly with an electric motor assist system.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 2:
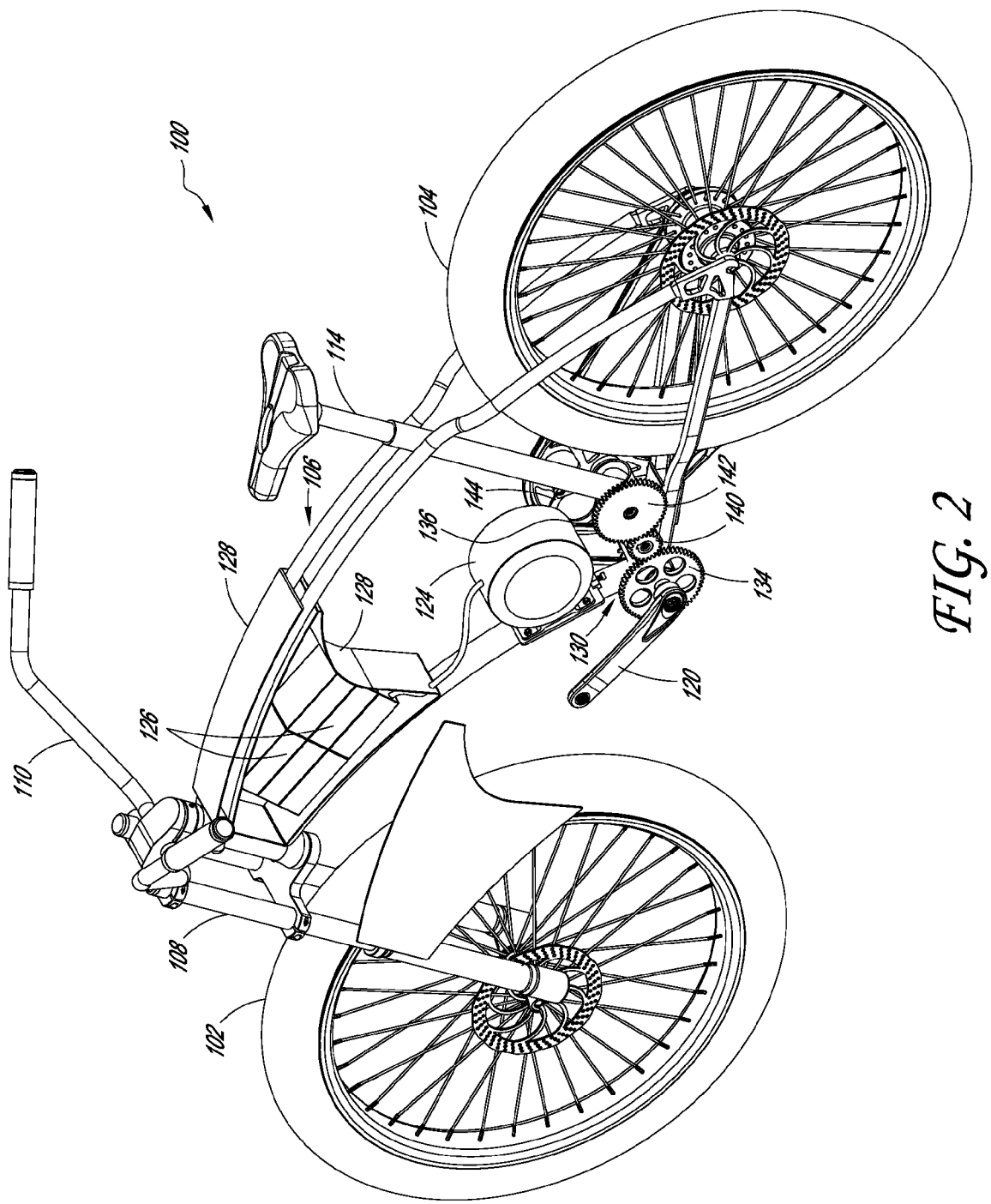
FIG. 2 is a perspective view of a portion of the opposite side of the bicycle shown in FIG. 1.

With reference to FIGS. 1 and 2, a bicycle 100 includes a front wheel 102, a rear wheel 104 and a frame 106 supported by the front wheel 102 and the rear wheel 104. The front wheel 102 is rotatably supported relative to the frame 106 by a front fork 108 for rotation about a steering axis. The illustrated front fork 108 is a dual-crown design, having a triple clamp below and above the head tube of the bicycle 100. However, any other suitable fork design could be used. A handlebar 110 is coupled to the front fork 108, via a suitable handlebar stem or clamp, and allows a user to steer the front wheel 102. The stem or clamp can be non-adjustable with respect to height, as shown, or can be height-adjustable. Typically, rotational adjustment of the handlebar 110 is permitted about a lateral axis. The frame 106 supports a bicycle seat or saddle 112, such as via a height adjustable seat post 114.

The bicycle 100 preferably includes a pedal crank assembly 120 and an electric motor assist system 122. The pedal crank assembly 120 is coupled (e.g., via a transmission arrangement) to the rear wheel 104 such that rotation of the pedal crank assembly 120 in at least one direction causes rotation of the rear wheel 104. The electric motor assist system 122 preferably includes a suitable electric motor 124 and a source of electric power, such as a battery 126 housed in a battery compartment 128. The illustrated battery compartment 128 is supported within a space defined by members of the bicycle frame 106, such as a space defined within the top tube, head tube, down tube and seat tube. Preferably, the battery compartment 128 is located closer to the head tube than the seat tube. The battery compartment 128 can contact the head tube in some configurations. The battery compartment 128 can wrap around the top tube (which can be a dual top tube arrangement—as illustrated) and can have a removable side panel for access to the interior of the battery compartment 128 and access to the battery or batteries 126.

The motor 124 can be positioned behind (and somewhat below, if desired) the battery compartment 128. In the illustrated arrangement, the motor 124 is mounted to the down tube of the bicycle frame 106. In addition or in the alternative, the motor 124 can be mounted to the seat tube or top tube, for example. The motor 124 is coupled to the rear wheel 104 (via a transmission arrangement) to selectively drive the rear wheel 104. If desired, the motor 124, pedal crank 120 and any desired transmission members can be covered by a suitable cover, shroud or housing (e.g, a chain guard) to avoid undesirable contact with the drive train components and/or to improve the appearance of the bicycle 100.

Preferably, a transmission arrangement 130 couples both the pedal crank 120 and the electric motor assist system 122 to the rear wheel 104. The illustrated transmission arrangement 130 includes gears provided on multiple rotational axes that are spaced in a lengthwise direction of the bicycle 100. In some configurations, the axes lie along a single line; however, in other configurations, one or more of the axes can be offset from a line defined by two or more other of the axes. In the illustrated arrangement, the transmission arrangement 130 includes three axes of rotation and the gears are identified herein based on the particular axis of rotation of the gear (that is, first, second or third axis). The transmission arrangement 130 comprises a first driven gear 132 and a first drive gear 134. The first driven gear 132 is driven by the motor 124 via an endless loop drive member 136 (e.g., a chain or belt). The first drive gear 134 is coupled for rotation with the first driven gear 132 and, preferably, can also be driven by the pedal crank assembly 120. However, the first drive gear 134 (and, in some configurations, the first driven gear 132) preferably is free to rotate faster than the pedal crank assembly 120 via a suitable freewheel or one-way clutch arrangement. For example, a one-way bearing arrangement can be provided between the gear 132 or 134 and the shaft of the pedal crank assembly 120.

The transmission arrangement 130 also comprises a second gear 140 that is arranged to be driven by the first drive gear 134. The second gear 140 can be referred to as a countershaft gear because it, and the shaft upon which it is supported, rotates in the opposite direction of the pedal crank assembly 120 and the rear wheel 104.

The transmission arrangement 130 further comprises a third driven gear 142 and a third drive gear 144 that are supported for rotation together with one another relative to the bicycle frame 106. The third driven gear 142 is driven by the second gear 140 and the third drive gear 144 drives the rear wheel 104 via an endless loop drive member 146 (e.g., a chain or belt).

Figure 3:
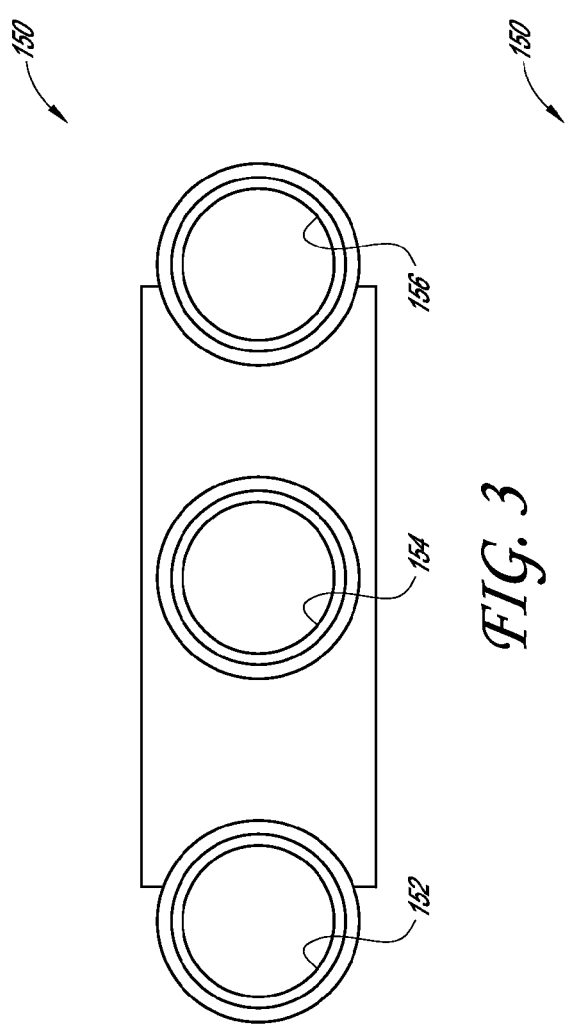
FIG. 3 is a side view of a bottom bracket member of a bicycle frame of the bicycle of FIG. 1.
Figure 4:
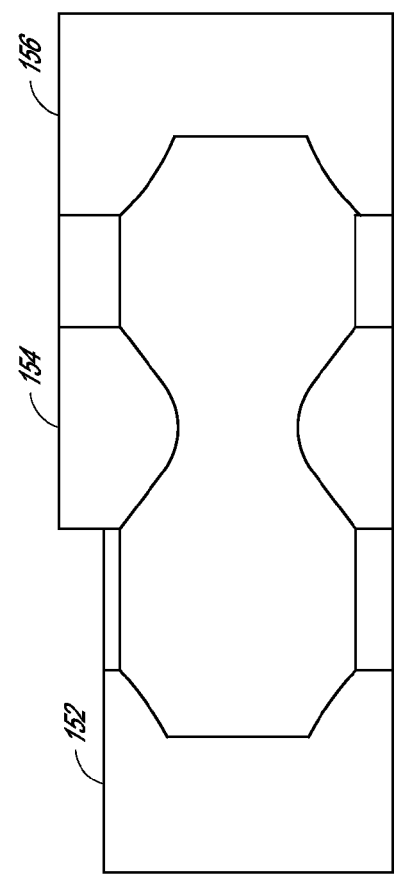
FIG. 4 is a top view of the bottom bracket member of FIG. 3.

With additional reference to FIGS. 3 and 4, preferably, the gears of the transmission arrangement 130 are supported by a bottom bracket 150, which can be an integrated or unitary assembly. For example, the bottom bracket 150 can be an assembly of individual members, such as tubular members, coupled by any suitable mechanism or process (e.g., welding). In such an arrangement, preferably the cavities or openings 152, 154, 156 used to support the transmission gear shafts are finally dimensioned (e.g., machined) after assembly so that the openings or cavities are well-aligned to reduce or minimize wear on the gears. Preferably, the bottom bracket 150 is a unitary (i.e., one-piece) construction. For example, the bottom bracket 150 can be machined from a single piece of material, such as billet aluminum or a piece of steel. In some cases, the bottom bracket 150 can be created as a unitary piece by a forging or molding process. Such arrangements also result in good alignment of the openings or cavities.

The bottom bracket 150 preferably is located at a junction between the lower end of the seat tube and the down tube. Preferably, the seat tube is coupled to one end of the bottom bracket 150 (e.g., at or near one end cavity) and the down tube is coupled to the other end of the bottom bracket 150 (e.g., at or near the other end cavity). The bottom bracket 150 can be in any orientation; however, it is preferable that the bottom bracket 150 is angled relative to a surface on which the bicycle rests. In the illustrated arrangement, the forward end of the bottom bracket 150 (end with opening 152) is lower than the rearward end of the bottom bracket 150 (end with opening 156). This provides good packaging of the transmission 130, pedal crank arrangement 120 and electric assist assembly 122 within the bicycle frame 106.

Figure 5:
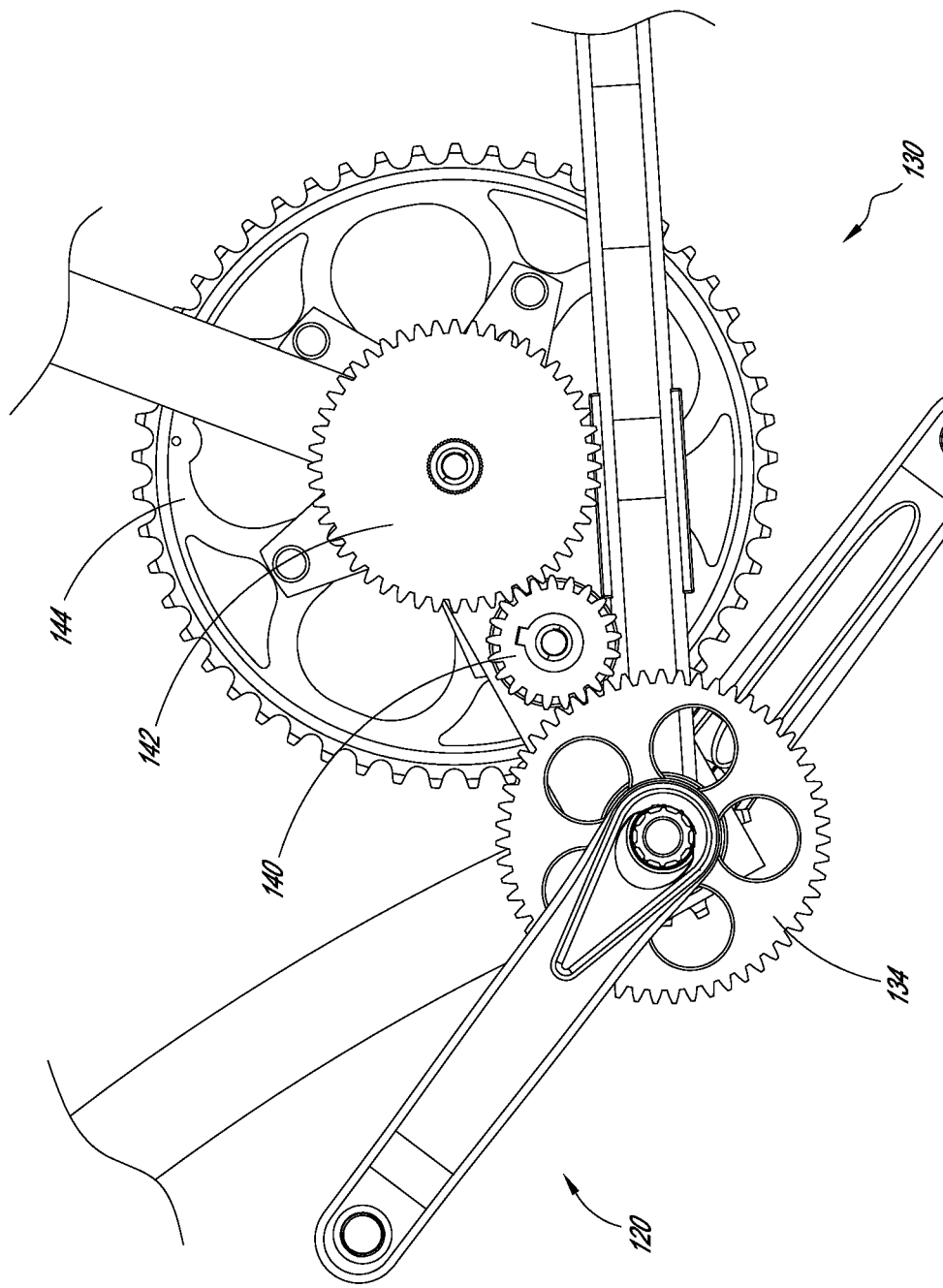
FIG. 5 is a side view of the bottom bracket portion of the bicycle of FIG. 1.
Figure 6:
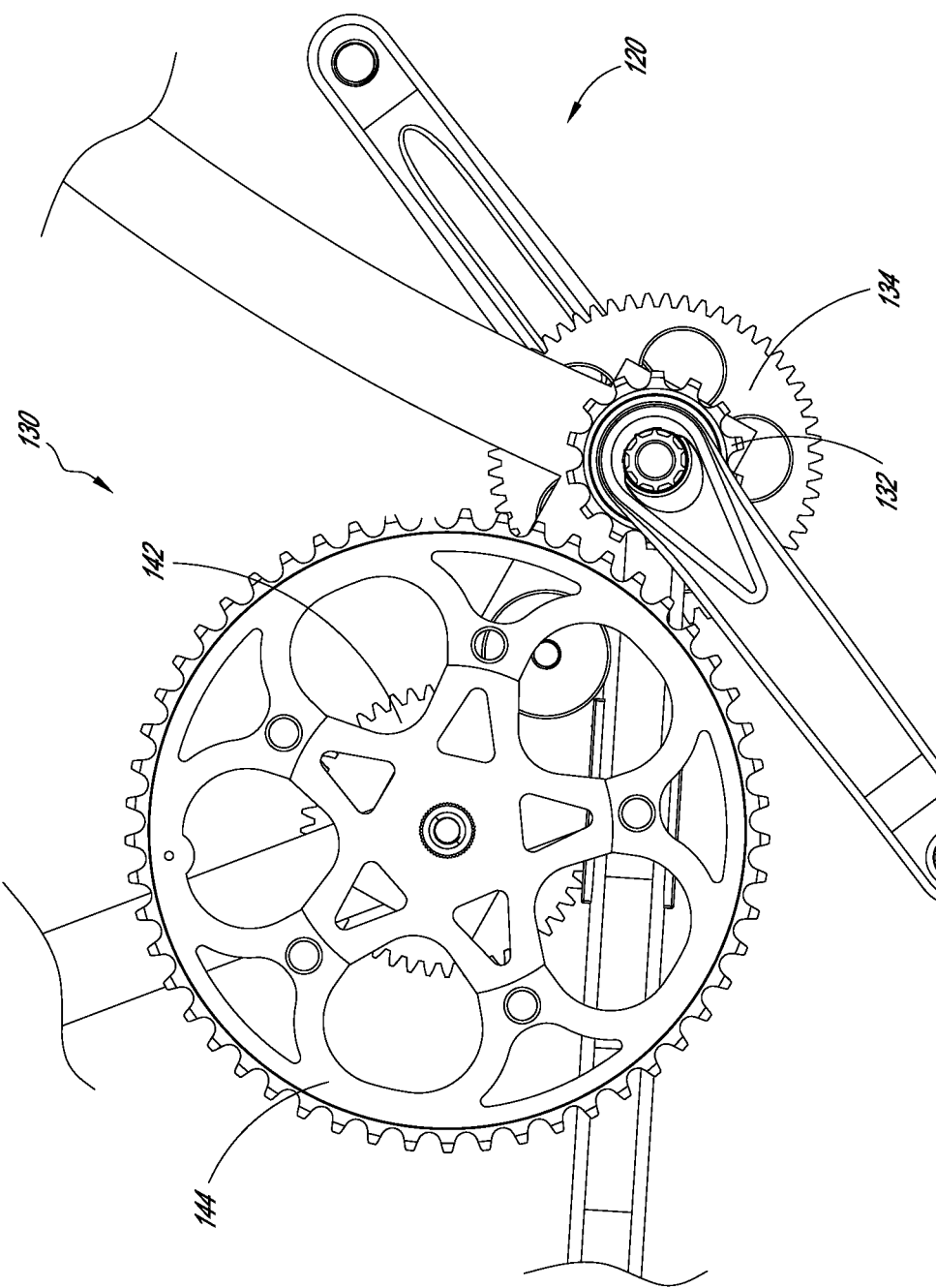
FIG. 6 is a side view of the opposite side of the bottom bracket portion of the bicycle shown in FIG. 5.

With reference to FIGS. 5 and 6, the first driven gear 132 and the first drive gear 134 are supported on a common axis (i.e., a first axis) by a shaft or shaft assembly (e.g., an axle of the pedal crank assembly 120). The second gear 140 is supported by a shaft for rotation about a second axis. The third driven gear 142 and the third drive gear 144 are supported by a common shaft on a common axis (i.e., a third axis). The second axis is between the first axis and the third axis. In the illustrated arrangement, the first driven gear 132 and the third drive gear 144 are chain wheels configured to engage a drive chain. The third drive gear 144 can be a standard bicycle chain wheel (or chain ring), such as a 53 tooth chain ring, for example. The other gears 134, 140, 142 can be bevel gears (e.g., straight or angled gears), for example.

The illustrated first driven gear 132 is a 14 tooth chain wheel or cog, which can be similar in size to or the same size as the output gear of the motor 124. Preferably, the first driven gear 132 is relatively small to provide a proper initial gear ratio and to avoid interference with other components, such as the bottom bracket 150 or third driven gear 142. Although a 14T gear is shown, other suitable sizes (e.g., 11T-18T) can also be used. The first drive gear 134 preferably is a 55 tooth gear and is sized larger than the first driven gear 132 to provide a positive gear ratio. For example, the first drive gear 134 has about 4 times as many teeth (3.93 ratio) as the first driven gear 132. However, other suitable gearing ratios (e.g., about 2-6) can also be used. The second gear 140 transfers motion from the first drive gear 134 to the third driven gear 142 and can be sized appropriately based on the sizes of the gears 134 and 142. In the illustrated arrangement, the second gear 140 is a 21 tooth gear. The third driven gear 142 preferably is sized relative to the third drive gear 144 to provide a positive gear ratio. In the illustrated arrangement, the third drive gear 144 is a 53 tooth chain wheel; however a 56 tooth chain wheel or other suitable sizes can be used to achieve a desired gear ratio. The gear ratio between the third driven gear 142 and the third drive gear 144 is about 1.1 with a 53T chain wheel and about 1.17 with a 56T chain wheel. In other configurations, the ratio can be, for example, between about 1 and 1.5. The final drive cog of the rear wheel 104 can be selected based on the overall gear ratio of the transmission 130. In addition, the rear wheel 104 can comprise additional gears (e.g., a derailleur controlled cluster of gears, an internal geared hub or a continuously variable arrangement) to alter the overall gear ratio of the entire system, such that a mode can be suitable for powering only manually via the pedal crank 120 or only by the electric drive assist 122 or a combination of the two. The aforementioned gear sizes and/or ratios are merely exemplary and other gear sizes or ratios can be selected based on the desired application.

In operation, the pedal crank assembly 120 and/or the electric motor assist arrangement 122 can be utilized to drive the rear (driven) wheel 104. The electric motor assist arrangement 122 can be controlled or actuated by any suitable mechanism. For example, a hand-operated throttle control is commonly used. Alternatively, a sensor can be utilized to sense rotation (or attempted rotation—e.g., applied force) of the pedal crank assembly 120, which then actuates the electric motor assist arrangement 122. A suitable controller can be provided to receive and send suitable control signals from and to sensors, the motor 124, the battery 126 and/or other components of the bicycle 100 to provide suitable operation of the electric motor assist arrangement 122 in response to user inputs or commands. Power applied to the pedal crank assembly 120 by the rider can supplement the power applied by the electric motor assist arrangement 122.

Conclusion

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle, comprising:
   a front wheel;

a rear wheel; and a frame supporting the front wheel and the rear wheel;

an electric motor supported by the frame;

wherein the frame further comprises a bottom bracket defining a first axis, a second axis and a third axis, wherein each of the first axis, the second axis and the third axis is spaced apart in a longitudinal direction of the bicycle from both of the others of the first axis, the second axis and the third axis;

a pedal crank assembly is supported for rotation about the first axis and comprises a first driven gear and a first drive gear, a second gear is supported for rotation about the second axis, and a third driven gear and a third drive gear are supported for rotation about the third axis, the motor drives the first driven gear and the first drive gear rotates in response to rotation of the first driven gear, the first drive gear engages and rotates the second gear, which drives the third driven gear, the third drive gear rotates in response to rotation of the third driven gear, and the third drive gear is rotationally coupled to the rear wheel.

2. The bicycle of claim 1, wherein the bottom bracket is of an integral or unitary construction.

3. The bicycle of claim 1, wherein the first drive gear, the second gear and the third driven gear are direct-engagement bevel gears, which can have linear or angled gear teeth.

4. The bicycle of claim 3, wherein the first driven gear and the third drive gear are chain or belt-drive sprockets and are connected to the motor and rear wheel, respectively, by a chain or belt.

5. A bicycle, comprising:

a front wheel;

a rear wheel; and a frame supporting the front wheel and the rear wheel;

an electric motor supported by the frame;

wherein the frame further comprises a bottom bracket defining a first axis, a second axis and a third axis;

a pedal crank assembly is supported for rotation about the first axis and comprises a first driven gear and a first drive gear, a second gear is supported for rotation about the second axis, and a third driven gear and a third drive gear are supported for rotation about the third axis, the motor drives the first driven gear and the first drive gear rotates in response to rotation of the first driven gear, the first drive gear engages and rotates the second gear, which drives the third driven gear, the third drive gear rotates in response to rotation of the third driven gear, and the third drive gear is rotationally coupled to the rear wheel, wherein the bottom bracket is oriented such that the third axis is higher than the first axis when the bicycle is standing upright on a level surface.

6. The bicycle of claim 1, wherein the first axis, the second axis and the third axis are disposed along a straight line.

7. The bicycle of claim 1, wherein the motor is mounted to a down tube of the frame of the bicycle.

8. The bicycle of claim 1, further comprising a battery compartment coupled to the frame and configured to support the battery in a space between the top tube and the down tube of the bicycle.

9. The bicycle of claim 8, wherein the motor is positioned between the battery compartment and the bottom bracket.

10. The bicycle of claim 1, wherein the first axis, the second axis and the third axis are parallel to one another.

* * * * *